Aug. 4, 1964  G. H. BRUNKAN  3,143,216
BOOM MEANS

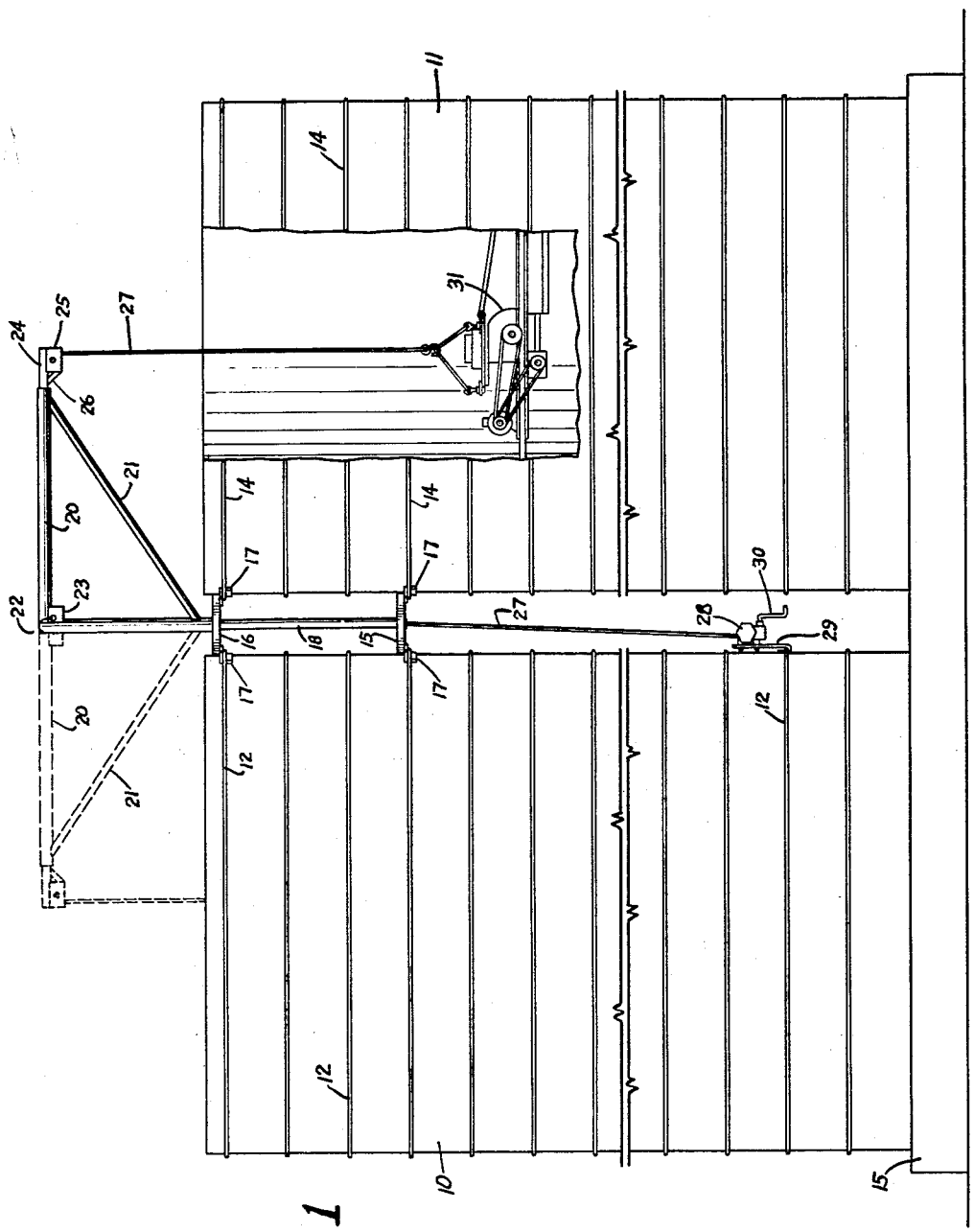

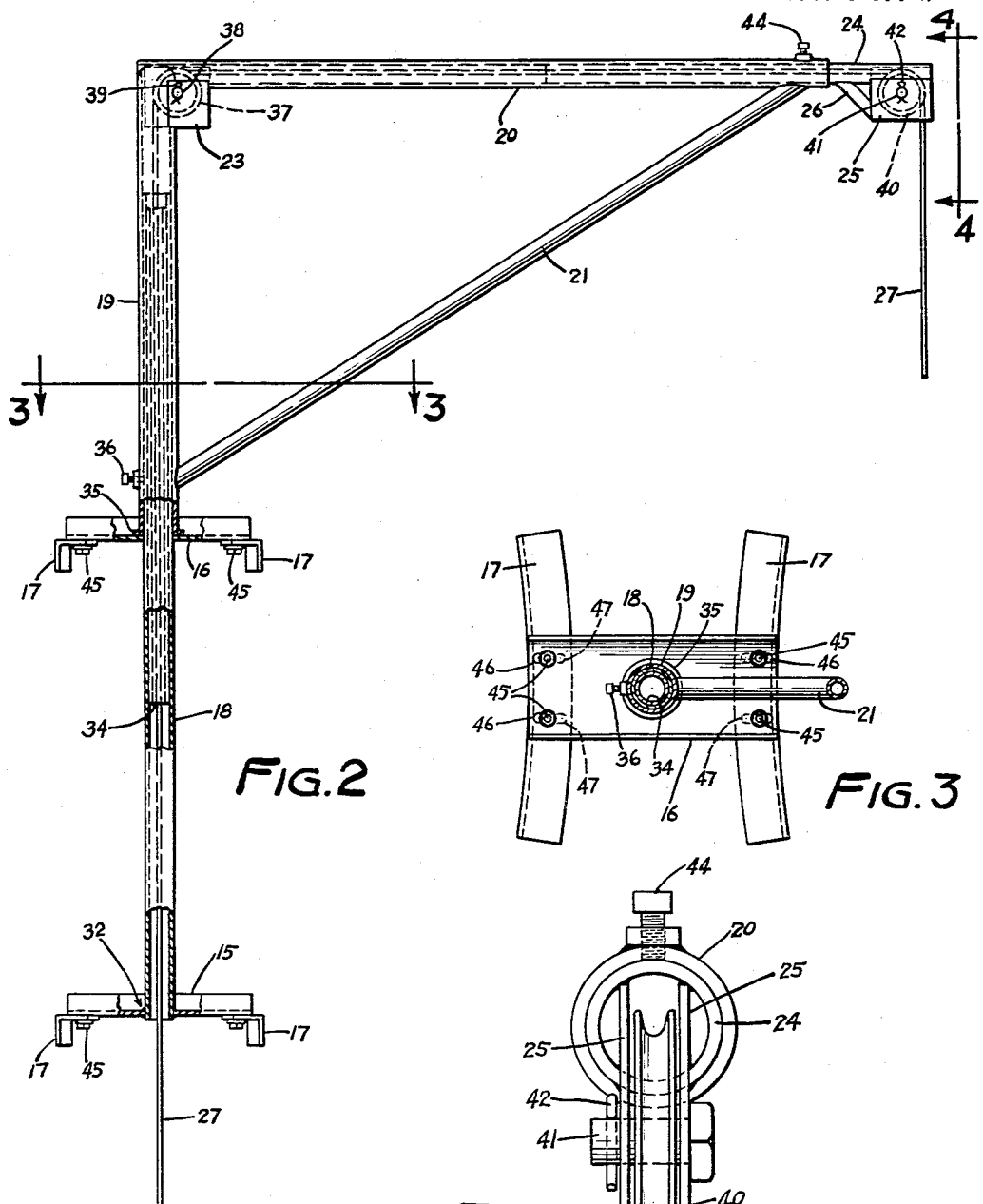

Filed Jan. 16, 1961  5 Sheets-Sheet 3

INVENTOR.
GUS H. BRUNKAN
BY Moore, White & Burd
ATTORNEYS

Aug. 4, 1964

G. H. BRUNKAN 3,143,216

BOOM MEANS

Filed Jan. 16, 1961

INVENTOR.
GUS H. BRUNKAN
BY
Moore White & Duid
ATTORNEYS

Aug. 4, 1964     G. H. BRUNKAN     3,143,216
BOOM MEANS

Filed Jan. 16, 1961     5 Sheets-Sheet 5

INVENTOR.
GUS H. BRUNKAN
BY Moore White & Burd
ATTORNEYS

United States Patent Office 3,143,216
Patented Aug. 4, 1964

3,143,216
BOOM MEANS
Gus H. Brunkan, 408 2nd Ave. SE., Dyersville, Iowa
Filed Jan. 16, 1961, Ser. No. 83,039
17 Claims. (Cl. 212—61)

This invention comprises a boom means particularly adapted for use in connection with tower silos or the like for raising, lowering and supporting heavy machinery such as unloader mechanisms and the like.

In recent years the use of silo unloaders has become recognized as a practical replacement for manual emptying of silos or the like. This type of machine has greatly reduced the amount of physical effort required to empty the silo storage units, but it has necessitated the installation and handling of the relatively heavy unloader.

A common practice among manufacturers of this type of equipment has been to provide structures that may be disassembled easily and transported into the silo in sections or pieces. Once installed the unit may be raised and lowered or supported within a given silo by means of a winch with a cable or the like reeved over a pulley secured to a tripod support positioned at the top of the silo.

In order to remove the silo unloader from the silo it has been usually desirable to dismantle the same and remove it portion by portion. While it is most advantageous to remove the silo unloader from the silo whenever the latter is not in use, and in fact this procedure is recommended by some manufacturers of such equipment, this procedure is not always followed. This invention allows easier installation and removal of a silo unloader particularly where, as is often today, the silo has no roof.

Further, in order to have mechanical unloading facilities, for dual silos, it is sometimes desirable to be able to move the unloader from one silo to the next.

Accordingly it is the principal object of the invenion to provide a novel boom means for a silo unloader or the like.

It is a further object of this invention to provide such a silo unloader boom means that is supported on the outside of the silo.

Yet another object of this invention is to provide a silo unloader boom means that is supported by means of engaging the hoops or bands which reinforce the silo.

A still further object of this invention is to provide a silo unloader boom means which is supported by the walls of two adjacent silos and is pivotally mounted on its support whereby it may serve as a boom for either of the two silos between which it is mounted.

Another object of this invention is to provide a silo unloader boom having a variable length boom thereon so that it may be adapted to silos of various sizes or may be altered to perform specific different functions in a silo of a given size.

It is yet another object of this invention to provide a silo unloader lifting boom which by reason of being hollow and having mounting elements that engage the bands or hoops on the outside of a silo, can have its vertical portions readily supported on the exterior of a silo adjacent the wall thereof thereby providing access for a cable through its hollow interior to a winch secured to the silo adjacent its exterior.

A further object of this invention is to provide a silo unloader lifting boom adapted to have a mast pivotally supported adjacent the silo wall and with a boom extending therefrom that can be swung to either side of the silo wall for use in lifting and lowering either outside or inside of a silo.

It is another object of this invention to provide a silo unloader lifting boom the parts of which may be disassembled one from the other for ready attachment to a silo.

Other objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

FIGURE 1 is a side elevation of two silos shown in fragment and having the invention associated therewith; a portion of one silo is broken away to illustrate the use of the invention supporting a silo unloading structure; broken lines illustrate an adjusted position;

FIGURE 2 is an enlarged side elevational view of one form of the invention with portions thereof broken away to illustrate internal construction fully; broken lines illustrate hidden parts; the ends of the flexible element are deleted to conserve space;

FIGURE 3 is a still further enlarged horizontal section taken at 3—3 of FIGURE 2;

FIGURE 4 is a fragmentary end elevation taken at 4—4 of FIGURE 2 and drawn to a much larger scale than any preceding figure; broken lines illustrate hidden parts;

Figure 10:
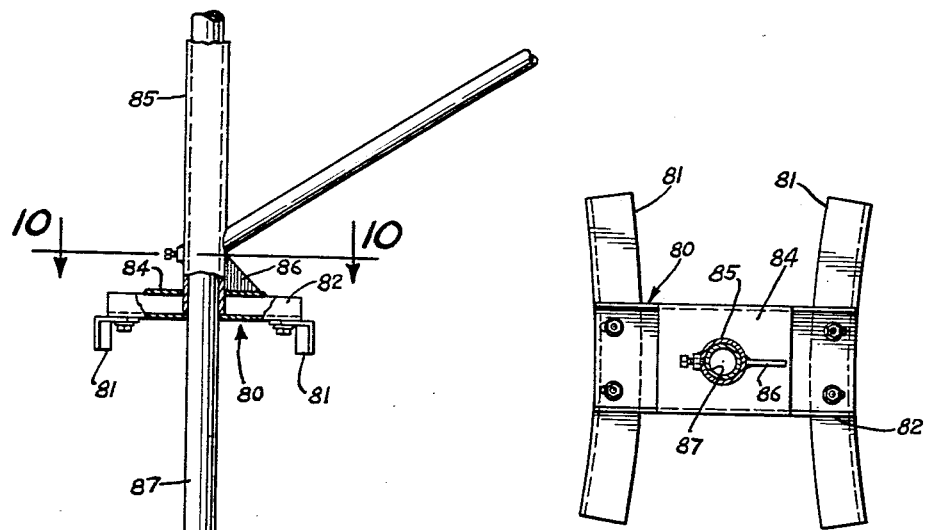
Figure 9:
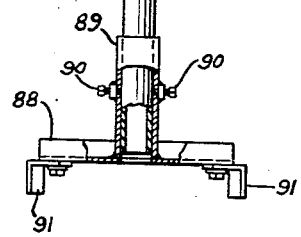

FIGURE 9 is a fragmentary side elevation of a modified form of the boom means illustrated in FIGURES 1, 2 and 3 with portions of the device broken away to illustrate its construction fully; broken lines illustrate hidden parts and the scale used is the same as that of FIGURE 2; and FIGURE 10 is a plan view of the bracket taken on the line 10—10 of FIGURE 9. Broken lines illustrate hidden parts and the figure is drawn to the same scale as FIGURE 3.

FIGURE 1 discloses the silos 10 and 11 having usual silo reinforcing bands or hoops 12 and 14. Reinforcing bands 12 and 14 are of the usual type that may be tightened or loosened by means of structure well known and therefore not described. Also the band tightening structure is not part of this invention but is merely used in mounting the invention on a silo. A foundation for the silos is represented at F. When silos are thus located adjacent to each other as shown in FIGURE 1 a preferred form of the silo unloader boom means may be one supported between them.

As shown in FIGURE 1 two brackets designated 15 and 16, respectively for the lower and upper, are provided at their ends for suitable means for engaging the walls of the silos 10 and 11. As here shown this means may be the downwardly projecting hook-like structure 17 adapted to extend between the wall of the silo and one of the reinforcing bands 12 and 14. A tubular member or mast anchor means 18 is supported by these brackets in a vertical position outside of but adjacent the walls of the silos. Mast anchor 18 may take any suitable form but is preferably a hollow member. A mast 19 telescopically embraces the end of mast anchor 18 that extends above bracket 16. The lower end of mast 19 rests upon the bracket 16. Mast anchor 18 and mast 19 are so formed as to permit the latter to pivot about the former which is most easily accomplished by making them of telescoping cylinders.

A boom arm 20 is secured to the upper end of the mast 19 and extends laterally therefrom and desirably in a horizontal position. Suitable bracing such as the diagonal shown at 21 in FIGURE 1 provides a support for the outer end of the boom 20. As is true of mast anchor 18 and mast 19, the boom arm 20 is preferably hollow and conveniently formed from tubular material. At the point of intersection 22 of the mast 19 and boom arm 20, a portion of each is cut away. At either side of the cut away portion is secured a bearing plate such as the one designated 23 in FIGURE 1. The boom arm 20 may be provided with an extension element 24 that slidably engages the hollow unit forming the principal portion of the boom arm which sliding portion may be extended or shortened to adjust the boom as circumstances require. Boom arm extension 24 is cut away at its outer bottom to receive a pair of bearing plates, such as the one 25, which are secured in the cut away in a suitable manner such as by welding or the like. If extension 24 is not used, boom arm 20 is cut away and the bearing plates secured to it. These bearing plates may be reinforced as shown at 26 in FIGURE 1.

A flexible element or cable 27 extends through the hollow interior of the boom arm 20, mast 19, mast anchor 18 and terminates at a winch 28 secured near the base of one of the silos. The winch may be supported in any suitable manner, shown as a hook 29 which engages one of the reinforcing bands 12 of the silo 10. Suitable means are provided to drive winch 28 such as crank handle 30.

A silo unloader 31 appears in FIGURE 1 supported by flexible element 28 within the silo 11. Some portions of the silo unloader have been removed but it is retained principally in its entirety while being lifted by flexible element 27.

When it is desired to use silo unloader 31 in silo 10, winch 30 is actuated until the silo unloader 31 is raised above the top of silo 11. At this point mast 19 is pivoted about mast anchor 18, as illustrated in FIGURE 1 in broken lines, at which time silo unloader 31 will be supported above silo 10. By means of winch 28, the holding force exerted on cable 27 may be controllably released and silo unloader 31 may be lowered to the surface of the ensilage of silo 10. When it is desirable to have the silo unloader on the exterior of silos, boom arm 20 may be stopped in an intermediate position and winch 28 actuated to lower the unloader outside the silos.

In FIGURE 2 the structure of the brackets of a silo unloader lifting boom are shown in detail. Here the mast anchor 18 is shown as being rigidly secured to bracket 15 by suitable means as by welding as shown at 32, for example. Upper bracket 16 embraces the upper part of the mast anchor 18 but is not rigidly secured thereto. In this manner the two brackets may be moved to and from each other along tube 18 in order to accommodte themselves to the distance between suitable ones of the reinforcing bands 12 and 14 for mounting. As shown in FIGURE 2 the mast anchor 18 may be provided with an internal, affixed stiffening tube such as the one 34.

The mast 19 has its lower end resting on the bracket 16. A collar 35 may be provided at the lower end of mast 19 to increase the bearing surface thereof on bracket 16 if desired. A means such as set screw 36 may be employed for releasably locking mast 19 with respect to mast anchor 18.

As shown in FIGURE 2 bearing plates 25 rotatably support a pulley or sheave 37 which is appropriately mounted on any suitable axle such as the one 38 therein. Any appropriate means such as cotter key 39 may be used to hold the axle 38 in the bearing plates 24. Bearing plates 25 similarly support a sheave 40 mounted on 41 retained by cotter key 42.

The sliding portion 24 of boom 20 may be releasably locked with respect to boom 20 by any suitable means such as the set screw 44. It is shown clearly in FIGURE 4 bearing plates 25 extend through the cut away portion of tube element 24 and are secured thereto suitably as by welding.

Figure 5:
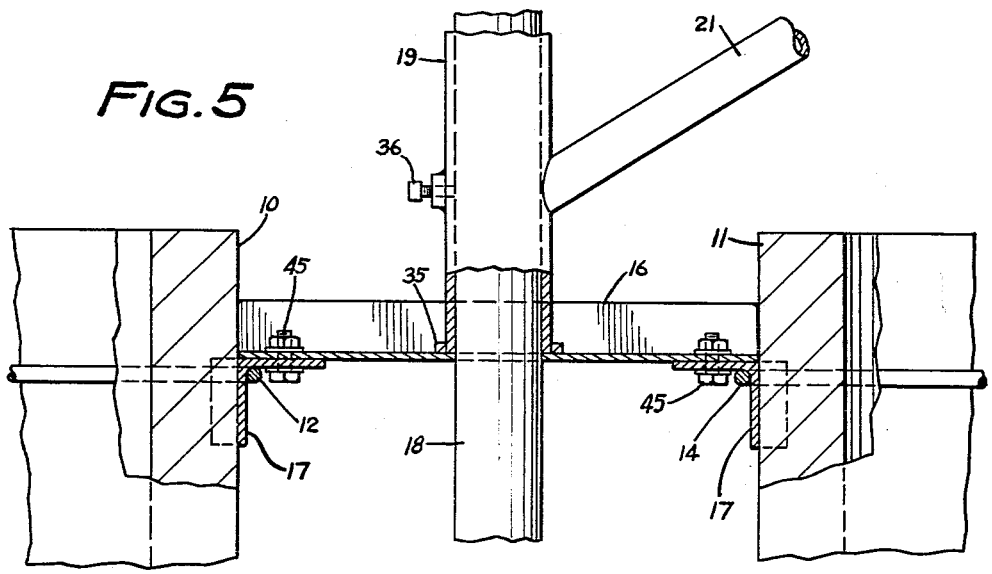
FIGURE 5 is a partial side elevation, partial section of the structure illustrated in FIGURE 3; in addition, fragments of two silos are shown; portions of the silos are broken away to illustrate the boom structure more fully; the figure is drawn to a scale substantially larger than that used in FIGURE 3 but smaller than that used in FIGURE 4, and broken lines illustrate hidden parts.

FIGURES 3 and 5 illustrates the bracket structure in detail. As shown in those figures, the bracket 16 is provided with curved angle members 17 which have depending flanges adapted, by reason of being curved slightly, to extend between the wall of a silo and the reinforcing bands used with it. The elements 17 are secured to the bracket plate 16 by suitable means such as nut and bolt assemblies 45. As shown clearly in FIGURE 3, the bracket 16 is provided with slots 46 and element 17 with the slots 47 by means of which some adjustment is permitted between the elements 17 and bracket plate 16.

Figure 8:
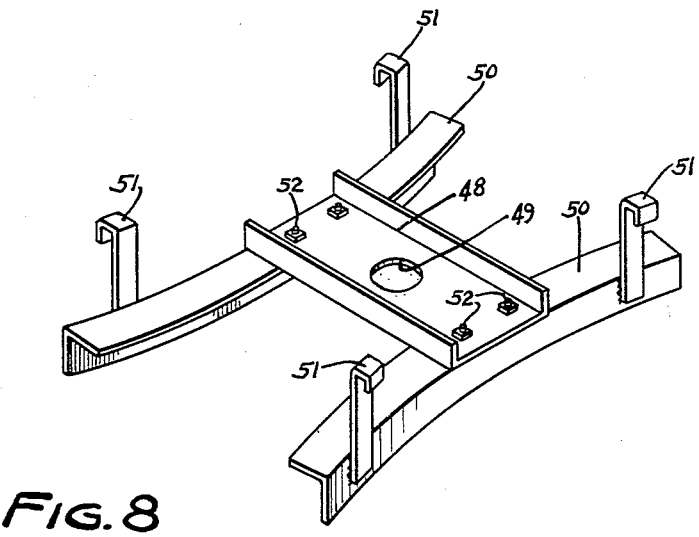
FIGURE 8 is an isometric view of a modified form of bracket structure for a form of the device illustrated in FIGURES 1-5 it is drawn approximately to the scale used in FIGURE 3.

FIGURE 8 illustrates a modified bracket 16 which structure may also be applied to bracket 15 if desired. In FIGURE 8, bracket plate 48 is provided with an appropriate opening 49 through which the mast anchor may extend. Elements 50 are provided to engage the silo wall while the hook elements 51 that are appropriately fixed to the elements 50 are adapted to hook over the reinforcing bands of the silo to support the bracket thereon. The bracket plate 48 and elements 50 are secured together in a suitable manner as by the nut and bolt assemblies 52.

The device illustrated in FIGURES 1–5 is easily mounted on the silo by first loosening the bands 12 and 14 near the top of the silo to permit the installation of the depending hook elements 17 of bracket 16 between the silo walls and the reinforcing bands. After the bracket is appropriately placed, the reinforcing bands are tightened until they clampingly engage the hook elements 17. With the bracket 16 thus fixed in place, mast anchor 18 together with the bracket 15 is raised until the upper end of the mast anchor 18 slidingly emerges through the appropriate opening provided in the bracket plate 16. When a suitable amount of mast anchor 18 extends above bracket plate 16, bracket 15 is located on the nearest suitable reinforcing bands. It is secured by loosening the reinforcing band, inserting the elements 17 between them and the silo wall, and tightening the bands as with bracket 16. It will be noted no single piece lifted at any one time in order to make the installation is of great weight.

Once the mast anchor is secured to the silos, installation is completed by raising the mast to a sufficient height to get the end of it over the end of the mast anchor 18 and telescopically engaging the two elements until the bottom of mast 19 rests on the mast anchor bracket 16. Flexible element 27 may then be reeved through the hollow boom, mast and mast anchor so as to extend as shown in FIGURE 1.

The winch 28 is suitably fixed to one of the silos near its base by loosening one of the bands 12, engaging hooks 29 therewith and tightening the band. This procedure secures the winch against upward movement when it is used to exert downward pull on flexible element 27.

The mast can be seen to extend above the tops of the silos but adjacent to their outside portions and to have the boom which extends from the mast a distance substantially greater than the distance from the mast to the ends of the brackets. The mast may, therefore, be pivoted about the mast anchor to provide a point from which a vertical lifting force may be applied either inside or outside the silos. As shown in FIGURE 1, the lifting boom may be used in raising the silo unloader 31 from the silo 11, in order to transfer it to silo 10 or vica versa. This same structure will serve to lower unloader 31 on the exterior of the silos when such is desirable. Likewise, the boom may be used to lift a silo unloader assembled outside the silo in order to place it in either of the two silos at the time of initial installation.

Figures 6, 7:
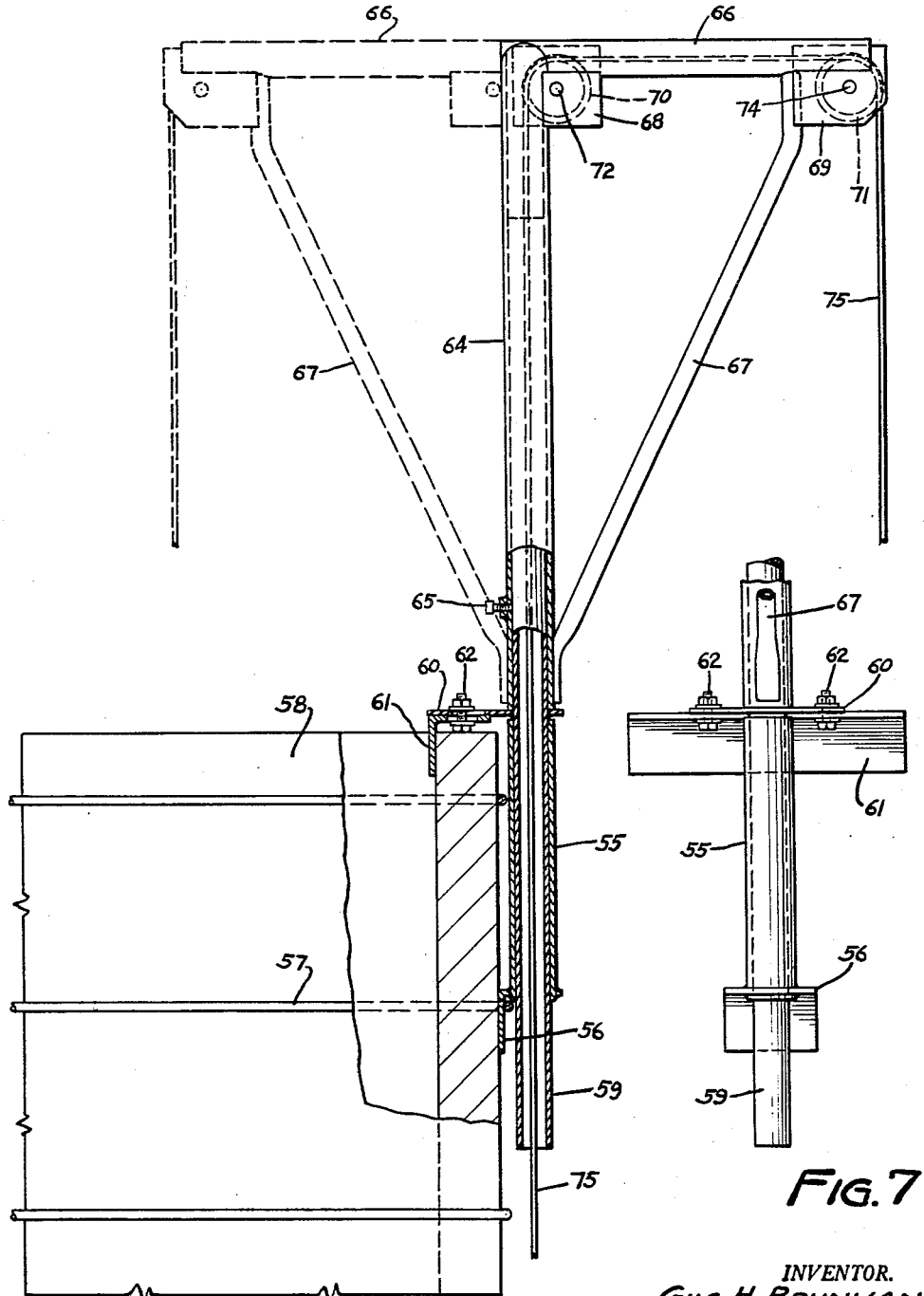
FIGURE 6 is a partial side elevation, partial vertical section of a modified form of the structure with broken lines illustrating hidden and adjusted parts; the scale used is smaller than that of FIGURE 5 and larger than that of FIGURE 3.
FIGURE 7 is a fragmentary end elevation of a portion of the structure illustrated in FIGURE 6 and drawn to the same scale; broken lines illustrate hidden parts.

FIGURES 6 and 7 show a modified form of the structure which is adapted for use with a single silo. In this form of the device, the mast anchor consists of an outer tube 55 to which a depending hook-like element 56 is suitably secured as by welding or the like. Element 56 is adapted to engage a reinforcing band such as those 57 of silo 58. The second portion of the mast anchor in this modified form of the invention consists of a tube 59 to which a bracket plate 60 is rigidly secured as by welding or the like. A hook-like member 61 is secured to bracket plate 60 in any suitable manner as by nut and bolt assemblies 62. Tube 59 telescopes inside of tube 55 and the two reinforce each other as well as providing a sliding joint between the two hook elements 56 and 61 whereby they each may engage some portion of the silo without requiring a fixed distance between the elements that they engage. Thus if silo reinforcing band 57 were somewhat lower than shown in FIGURE 6, tube 55 could slide down tube 59 until the element 56 appropriately engaged it. Obviously, the type of mast anchor shown in FIGURES 6 and 7 could be employed between adjacent silos if desired.

A mast 64 telescopically and pivotally engages tube 59 of the mast anchor. Suitable means such as a set screw 65 is provided for locking tube 64 with respect to tube 59. A boom arm 66, preferably hollow, is rigidly secured to mast 64 and extends laterally therefrom. It is suitably braced by a member 67 which is rigidly secured near the outer end of the boom and to the lower end of mast tube 64 as by welding and the like. Bearing plates comparable to those designated 23 and 25 are shown at 68 and 69 for the junction of the mast boom and the outer end of the boom respectively. These bearing plates support rotatably the sheaves 70 and 71 on suitable axles such as 72 and 74. A flexible element 75 is reeved over the sheaves and is guided thereby inside the hollow boom mast and mast anchor so that it depends from the outer end of the boom and a point that lies at least very near to, and here actually within, a vertical downward projection of the mast anchor.

A winch secured to the silo 58 in the same manner as winch 28 is employed with the modified form of the boom shown in FIGURES 7 and 8. The entire unit is installed and used in a manner comparable to that described for the form of boom shown in FIGURES 1–5.

The modified form of the device shown in FIGURE 9 includes an upper bracket 80 which carries the silo band engaging member 81. Instead of having the mast supported only by the channel member 82, however. A plate 84 is secured to the bracket 82 in any suitable manner as by welding or the like. The mast 85 extends through appropriate opening in plate 84 and the bottom of mast 85 engages the inside of channel 82. On top of plate 84, however, is the small support base 86 which is rigidly secured to the mast 85. The small support base 86 engages the plate 84 to resist bend forces applied to the anchor and mast.

Mast anchor 87 is secured to the channel 88 by an adjustable means here shown as a tube 89 that slidably embraces the outside of mast anchor 87. Any suitable means such as the set screws 90 may be used to fix the positon of mast anchor 87 with relation to tube 89. Channel 88 also carries silo band engaging means such as the ones designated 91. Mast anchor 87 is secured to channel 88 by an adjustable means, therefore, providing a greater range of adjustments for differently spaced silo bands than would be true were the mast anchor secured rigidly to channel 88 and could slide only in relation to channel 82.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A boom means comprising; a mast anchor, means for securing said mast anchor to the exterior of a silo, a mast pivotally supported by said mast anchor, a boom arm secured to and extending from said mast, a flexible element, and means secured to said mast and said boom for guiding said flexible element, said flexible element engaging said guiding means, the ends of said flexible element depending from the extending end of said boom arm and said mast, said means for securing said mast anchor to the exterior of a silo including a downwardly projecting hook-like element adapted to engage a reinforcing band of a silo.

2. A boom means comprising; a mast anchor, means for securing said mast anchor to the exterior of a silo, a mast pivotally supported by said mast anchor, a boom arm secured to and extending from said mast, a flexible element, and means secured to said mast and said boom for guiding said flexible element, said flexible element engaging said guiding means, the ends of said flexible element depending from the extending end of said boom arm and said mast, said boom arm comprising a pair of telescoping tubes and means to lock and release them with relation to each other selectively.

3. A boom means comprising; a mast anchor, means for securing said mast anchor to the exterior of a silo, a mast pivotally supported by said mast anchor, a boom arm secured to and extending from said mast, a flexible element, means secured to said mast and said boom for guiding said flexible element, said flexible element engaging said guiding means, the ends of said flexible element depending from the extending end of said boom arm and said mast, and means are provided for locking and releasing selectively said mast with respect to said mast anchor at will.

4. A boom means comprising: a mast anchor, brackets secured to said mast anchor, means on said brackets adapted to be inserted between a silo wall and the reinforcing bands thereof, a mast pivotally mounted on said mast anchor and having its lower end resting on the upper of said brackets, a boom arm rigidly secured to and extending horizontally from said mast, said boom arm being substantially longer than the distance from said mast anchor to the ends of said brackets, said mast anchor, mast and boom arm all being formed from tubes, portions of said mast and said boom where they come together being cut away, bearing plates rigidly secured to said mast and boom at their point of intersection, a sheave journaled in said bearing plates, a bearing plate secured to the outer end of said boom, a sheave journaled in said bearing plates at the outer end of said boom, a flexible element extending internally of said mast anchor, mast and boom and reeved over said sheaves, and a winch adapted to be secured to a band of a silo for exerting a pulling force on said flexible means and releasing said pulling force selectively.

5. The structure of claim 4 in which said means for engaging the bands of a silo comprise curved angle members secured to said brackets.

6. The structure of claim 5 in which a tube is secured inside said mast anchor.

7. The structure of claim 4 in which a stiffening tube is secured inside said mast anchor.

8. The structure of claim 4 in which said mast anchor comprises a tube, a bracket welded to the lower end of said tube, means on opposite ends of said bracket for engaging the bands of a silo, an upper bracket slidably embracing said tube, and means at opposite ends of said upper bracket for engaging the bands of a silo.

9. The combination of a pair of banded silos positioned near each other and a lifting boom comprising, yoke members extending between the two banded silos and at least one end of said yoke members being supported by the bands of said banded silos, a mast anchor supported by said yoke members, a mast pivoted about said mast anchor, a boom arm extending laterally from said mast, pulley means arranged on said mast and boom arm, a flexible element reeved over said pulleys and depending from the end of said boom arm at a point near said mast, whereby a pull exerted on said flexible element in an approximate vertical projection of said mast anchor and mast will exert a lifting force at the end of said boom, said means for engaging the band of a silo comprising curved angle members secured to said yoke element.

10. A boom means comprising a mast anchor, brackets secured to said mast anchor, means on said brackets adapted to support said brackets outside of a silo wall and adjacent thereto, a mast pivotally mounted on said mast anchor and having its lower end resting on the upper of said brackets, a boom secured to and extending laterally from said mast, said mast anchor and said mast and said boom all being hollow, means for guiding a flexible element secured to said mast and boom, a flexible element guided by said guiding means extending internally of said mast anchor, mast and boom, means adapted to be secured near the base of a silo for exerting a pulling force on said flexible means and releasing said pulling force selectively.

11. The structure of claim 10 in which said mast anchor comprises a tube, a bracket adapted to engage the band of the silo welded to said tube, a second tube, and a hook bracket welded to said second tube, said tubes telescopically fitting within each other.

12. A boom structure comprising a mast anchor, brackets secured to said mast anchor, means on said brackets adapted to secure said brackets to the outside of a silo wall adjacent thereto, a mast pivotally mounted on said mast anchor and having its lower end resting on the upper of said brackets, a boom secured to and extending laterally from said mast, said boom being more than twice as long from said mast to its end as the distance from the ends of said brackets to said mast anchor, and said mast and said boom all being formed from tubes, portions of said mast and said boom where they come together being cut away, bearing plates rigidly secured to said mast and boom at their point of intersection, a sheave journaled in said mast-boom bearing plates, bearing plates secured to the outer end of said boom, a sheave journaled in said boom end bearing plates, a flexible means reeved over said sheaves, and winch means adapted to be secured to a silo near its base for exerting, holding and releasing a pulling force on said flexible means selectively.

13. The structure of claim 12 in which said mast anchor comprises: a tube, a bracket adapted to engage the band of the silo welded to said tube, a second tube, and a hook bracket welded to said second tube, said tubes telescopically fitting within each other.

14. The structure of claim 12 in which said mast anchor comprises: a tube, a bracket welded to the lower end of said tube, means on opposite ends of said bracket for engaging the bands of the silo, and an upper bracket slidably embracing said tube and means at opposite ends of said upper bracket for engaging the bands of the silo.

15. A boom means comprising: a mast anchor, means secured to said mast anchor for supporting it adjacent to the outside of a silo, a mast pivotally mounted on said mast anchor and extending above the top of a silo, a boom arm secured to said mast and extending laterally therefrom a distance sufficient to extend into the area above a silo by which it is supported, and means associated with said boom for exerting a lifting force from the outer end thereof, said means secured to said mast anchor for supporting it adjacent to the outside of a silo including a hook adapted to extend between a silo wall and a reinforcing band thereof.

16. The boom means of claim 15 in which said means for supporting said mast anchor comprises a bracket slidably embracing said mast anchor, a plate secured to the top of said bracket, and a member secured to said mast, extending laterally therefrom and engaging said plate.

17. The boom means of claim 16 in which said means for supporting said mast anchor further includes, a second bracket, a hollow member rigidly secured to said second bracket, said mast anchor slidably fitting within said hollow member, and means secured to said hollow member for immobilizing said mast anchor therein selectively at will.

References Cited in the file of this patent

UNITED STATES PATENTS

| | | |
|---|---|---|
| 601,043 | McCarry | Mar. 22, 1898 |
| 689,642 | Fannon | Dec. 24, 1901 |
| 1,509,800 | Vogel | Sept. 23, 1924 |
| 1,705,431 | Weed | Mar. 12, 1929 |
| 2,292,353 | Ennis et al. | Aug. 11, 1942 |
| 2,509,950 | Zierke | May 30, 1950 |
| 2,565,091 | Reed | Aug. 21, 1951 |
| 2,577,338 | Leach | Dec. 4, 1951 |
| 2,745,976 | Bell | July 17, 1956 |
| 2,786,583 | Garrison | Mar. 26, 1957 |
| 2,859,881 | Coryell | Nov. 11, 1958 |
| 2,928,556 | White | Mar. 15, 1960 |